US012618799B2

(12) United States Patent
Tanaka et al.

(10) Patent No.: US 12,618,799 B2
(45) Date of Patent: May 5, 2026

(54) GAS SENSOR AND METHOD OF IDENTIFYING DEVIATION OF REFERENCE POTENTIAL OF THE SAME

(71) Applicant: NGK INSULATORS, LTD., Nagoya (JP)

(72) Inventors: Shingo Tanaka, Kasugai (JP); Yusuke Watanabe, Nagoya (JP); Ryo Hashikawa, Gifu (JP)

(73) Assignee: NGK INSULATORS, LTD., Nagoya (JP)

( * ) Notice: Subject to any disclaimer, the term of this patent is extended or adjusted under 35 U.S.C. 154(b) by 341 days.

(21) Appl. No.: 18/359,846

(22) Filed: Jul. 26, 2023

(65) Prior Publication Data

US 2024/0044835 A1 Feb. 8, 2024

(30) Foreign Application Priority Data

Aug. 5, 2022 (JP) ................................. 2022-125272

(51) Int. Cl.
*G01N 27/409* (2006.01)
*G01N 27/406* (2006.01)
(Continued)

(52) U.S. Cl.
CPC ....... *G01N 27/409* (2013.01); *G01N 27/4065* (2013.01); *G01N 27/4073* (2013.01); *G01N 27/419* (2013.01)

(58) Field of Classification Search
CPC ............. G01N 27/409; G01N 27/4073; G01N 27/419; G01N 27/4065
See application file for complete search history.

(56) References Cited

U.S. PATENT DOCUMENTS 6,059,947 A † 5/2000 Kato
2018/0284053 A1 10/2018 Watanabe et al.
(Continued)

FOREIGN PATENT DOCUMENTS

EP 0859233 A2 † 8/1998
JP 2010-122187 A † 6/2010
(Continued)

*Primary Examiner* — Alexander S Noguerola
(74) *Attorney, Agent, or Firm* — MATTINGLY & MALUR, PC

(57) ABSTRACT

A gas sensor includes a sensor element and a control device, and detects a specific gas concentration that is a concentration of a specific gas in a measurement-object gas. The sensor element includes an element body including an oxygen-ion-conductive solid electrolyte layer and provided with a measurement-object gas flow portion therein, the measurement-object gas flow portion introducing the measurement-object gas and causing the measurement-object gas to flow therethrough; a measurement electrode disposed in a measurement chamber of the measurement-object gas flow portion; and a reference electrode disposed inside the element body to come into contact with a reference gas that serves as a reference for detection of the specific gas concentration. The control device measures a voltage across the ground and the reference electrode, and identifies a deviation of the reference potential that is the electrical potential of the reference electrode based on the measured voltage.

7 Claims, 5 Drawing Sheets

(51) Int. Cl.
   *G01N 27/407*           (2006.01)
   *G01N 27/419*           (2006.01)

(56)                    References Cited

U.S. PATENT DOCUMENTS

2020/0309729 A1 * 10/2020 Watanabe ............ G01N 27/301
2022/0113278 A1 †  4/2022 Watanabe

FOREIGN PATENT DOCUMENTS

JP         2018-173320  A      11/2018
JP         2019-074360  A   †   5/2019

* cited by examiner
† cited by third party

Fig. 4

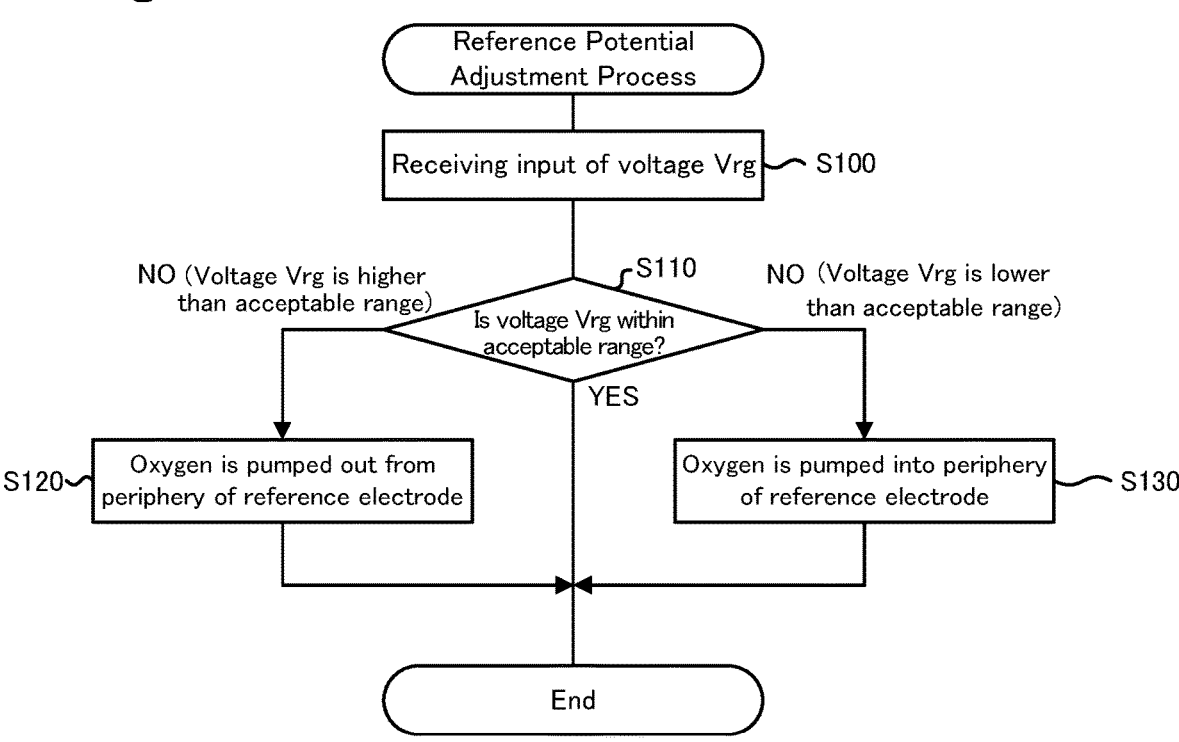

Reference Potential
Adjustment Process

Receiving input of voltage Vrg ⌐ S100

NO (Voltage Vrg is higher
than acceptable range)

S110

Is voltage Vrg within
acceptable range?

NO (Voltage Vrg is lower
than acceptable range)

YES

S120⌐ Oxygen is pumped out from
periphery of reference electrode

Oxygen is pumped into periphery
of reference electrode ⌐ S130

End

Fig. 5

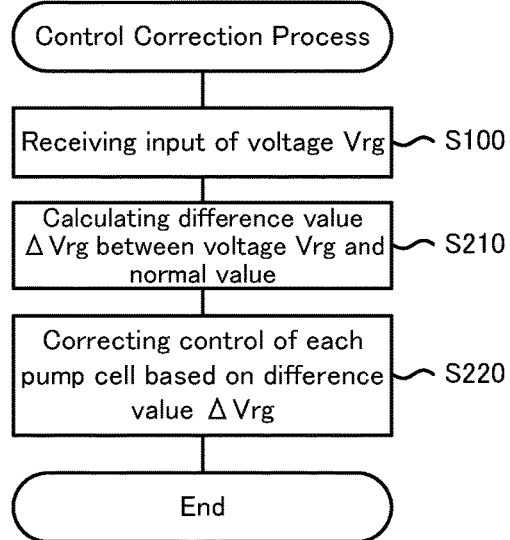

Control Correction Process

Receiving input of voltage Vrg ⌐ S100

Calculating difference value
ΔVrg between voltage Vrg and
normal value ⌐ S210

Correcting control of each
pump cell based on difference
value ΔVrg ⌐ S220

End

GAS SENSOR AND METHOD OF IDENTIFYING DEVIATION OF REFERENCE POTENTIAL OF THE SAME

The present application claims priority from Japanese Patent Application No. 2022-125272 filed on Aug. 5, 2022, the entire contents of which are incorporated herein by reference.

BACKGROUND OF THE INVENTION

1. Field of the Invention

The present invention relates to a gas sensor and a method of identifying the deviation of reference potential of the gas sensor.

2. Description of the Related Art

A known gas sensor in related art detects the concentration of a specific gas such as NOx in a measurement-object gas such as an exhaust gas of an automobile. For example, the sensor element of the gas sensor described in Patent Literature 1 includes: a layered body having a plurality of oxygen-ion-conductive solid electrolyte layers and provided therein with a measurement-object gas flow portion that introduces a measurement-object gas and causes the measurement-object gas to flow therethrough; a measurement electrode disposed in the measurement-object gas flow portion; a measurement-object-gas side electrode disposed in a part of the layered body to be exposed to the measurement-object gas; a reference electrode disposed inside the layered body; and a porous reference-gas introduction layer that introduces a reference gas (e.g., an atmospheric gas) serving as a reference for detection of a specific gas concentration in the measurement-object gas and causes the reference gas to flow to the reference electrode. This gas sensor detects the specific gas concentration in the measurement-object gas based on the electromotive force generated between the reference electrode and the measurement electrode. In addition, the gas sensor includes a reference gas adjustment device that pumps oxygen into the periphery of the reference electrode by passing a control current between the reference electrode and the measurement-object-gas side electrode. Patent Literature 1 states that when the oxygen concentration in the reference gas in the periphery of the reference electrode temporarily reduces, the reduction in the oxygen concentration can be compensated by the reference gas adjustment device that pumps oxygen into the periphery of the reference electrode, thus a decrease in the accuracy of detection of the specific gas concentration can be prevented.

CITATION LIST

Patent Literature

PTL 1: JP 2018-173320 A

SUMMARY OF THE INVENTION

Even when oxygen is pumped into the periphery of the reference electrode using the reference gas adjustment device as in the gas sensor described in Patent Literature 1, it is difficult to maintain the oxygen concentration in the periphery of the reference electrode at a constant value completely. When the oxygen concentration in the periphery of the reference electrode changes, the electrical potential of the reference electrode changes and the accuracy of detection of the specific gas concentration decreases. Thus, there has been a demand for identifying a deviation of the electrical potential of the reference electrode.

The present invention has been made to solve the aforementioned problems, and a main object thereof is to identify a deviation of the reference potential.

In order to achieve the aforementioned main object, the present invention employs the following solutions.

[1] A gas sensor of the present invention is a gas sensor including a sensor element and a control device and being configured to detect a specific gas concentration which is a concentration of a specific gas in a measurement-object gas, the sensor element including: an element body including an oxygen-ion-conductive solid electrolyte layer and provided with a measurement-object gas flow portion therein, the measurement-object gas flow portion introducing the measurement-object gas and causing the measurement-object gas to flow therethrough; a measurement electrode disposed in a measurement chamber of the measurement-object gas flow portion; and a reference electrode disposed inside the element body to come into contact with a reference gas that serves as a reference for detection of the specific gas concentration. The control device measures a voltage across a ground and the reference electrode, and identifies a deviation of a reference potential that is an electrical potential of the reference electrode based on the measured voltage.

In this gas sensor, the control device measures the voltage across the ground and the reference electrode. The voltage varies with change in the oxygen concentration in the periphery of the reference electrode, in other words, change in the reference potential that is the electrical potential of the reference electrode, thus it is possible to identify the deviation of the reference potential based on the voltage.

In this case, the control device may identify the deviation of the reference potential by comparing a measurement value of the voltage across the ground and the reference electrode with a normal value or an acceptable range. As specific examples of identifying the reference potential, comparison of a measurement value with a normal value or an acceptable range, and calculation of a value representing the deviation of the reference potential based on a measurement value may be mentioned. More specifically, magnitude relationship comparison of a measurement value with a normal value, calculation of the difference or ratio between a measurement value and a normal value, and determination as to whether a measurement value is in an acceptable range may be mentioned. The control device may identify the deviation of the reference potential by adopting one or more of these aspects.

[2] In the gas sensor described above (the gas sensor according to [1] stated above), the sensor element may include a reference-gas adjustment pump cell constituted by including a measurement-object-gas side electrode and the reference electrode, the measurement-object-gas side electrode being provided in the element body to come into contact with the measurement-object gas, and when the measured voltage is higher than an acceptable range, the control device may control the reference-gas adjustment pump cell so that oxygen is pumped out from a periphery of the reference electrode into a periphery of the measurement-object-gas side electrode, and when the measured voltage is lower than the acceptable range, the control device may control the reference-gas adjustment pump cell so that oxygen is pumped into the periphery of the reference electrode from the periphery of the measurement-object-gas side electrode. In this manner, the oxygen concentration in the periphery of the reference electrode can be adjusted according to the deviation of the reference potential, thus decrease in the accuracy of detection of the specific gas concentration can be prevented by reducing the deviation of the reference potential. Note that the control device may determine as to whether a measured voltage is higher or lower than an acceptable range, for example, by comparing the measured voltage with an acceptable range, or comparing the amount of deviation of the reference potential based on the measured voltage.

[3] In the gas sensor described above (the gas sensor according to [1] or [2] stated above), the sensor element may include a measurement pump cell constituted by including an outer measurement electrode and the measurement electrode, the outer measurement electrode being provided outside the element body to come into contact with the measurement-object gas, the control device may perform a measurement pump control process for controlling the measurement pump cell so that a measurement voltage that is a voltage across the measurement electrode and the reference electrode reaches a measurement voltage target value, and may detect the specific gas concentration in the measurement-object gas based on a pump current which flows through the measurement pump cell by the measurement pump control process, and the control device may correct control of the measurement pump cell in the measurement pump control process based on the identified deviation of the reference potential. In this manner, even if a deviation occurs in the reference potential, decrease in the accuracy of detection of the specific gas concentration can be prevented by correcting control of the measurement pump cell.

[4] In the gas sensor described above (the gas sensor according to [3] stated above), the sensor element may include an adjustment pump cell that is constituted by including an inner adjustment electrode and adjusts an oxygen concentration in an oxygen concentration adjustment chamber, the inner adjustment electrode being disposed in the oxygen concentration adjustment chamber located upstream of the measurement chamber of the measurement-object gas flow portion, the control device may perform an adjustment pump control process for adjusting the oxygen concentration in the oxygen concentration adjustment chamber by controlling the adjustment pump cell so that an adjustment voltage that is a voltage across the inner adjustment electrode and the reference electrode reaches an adjustment voltage target value, and the control device may correct control of the adjustment pump cell in the adjustment pump control process based on the identified deviation of the reference potential. In this manner, when a deviation occurs in the reference potential, not only the control of the measurement pump cell, but also the control of the adjustment pump cell is corrected, thus decrease in the accuracy of detection of the specific gas concentration can be further prevented.

[5] In the gas sensor described above (the gas sensor according to any one of [1] to [4] stated above), the sensor element may include a ground terminal connected to the ground, and the control device may measure a voltage across the ground terminal and the reference electrode as a voltage across the ground and the reference electrode.

[6] In the gas sensor described above (the gas sensor according to [5] stated above), the sensor element may include a heater that heats the element body, and the ground terminal may be a terminal of the heater.

[7] A method of identifying a deviation of the reference potential of the gas sensor of the present invention is a method of identifying a deviation of the reference potential of a gas sensor that detects a specific gas concentration which is the concentration of a specific gas in the measurement-object gas, the gas sensor including a sensor element having: an element body including an oxygen-ion-conductive solid electrolyte layer and provided with a measurement-object gas flow portion therein, the measurement-object gas flow portion introducing the measurement-object gas and causing the measurement-object gas to flow therethrough; a measurement electrode disposed in the measurement-object gas flow portion; and a reference electrode disposed inside the element body to come into contact with a reference gas that serves as a reference for detection of the specific gas concentration, the method including a step of measuring a voltage across a ground and the reference electrode, and identifying a deviation of the reference potential that is an electrical potential of the reference electrode based on the measured voltage.

As with the gas sensor described above, the deviation of the reference potential can be identified by this identification method. Note that in the identification method, various aspects of any gas sensor described above (the gas sensor according to any one of [1] to [6] stated above) may be adopted, or a step of implementing the function of any gas sensor described above (the gas sensor according to any one of [1] to [6] stated above) may be added.

BRIEF DESCRIPTION OF THE DRAWINGS

FIG. 4 is a flowchart illustrating an example of a reference potential adjustment process.

FIG. 5 is a flowchart illustrating an example of a control correction process.

DETAILED DESCRIPTION OF THE INVENTION

Figure 1:
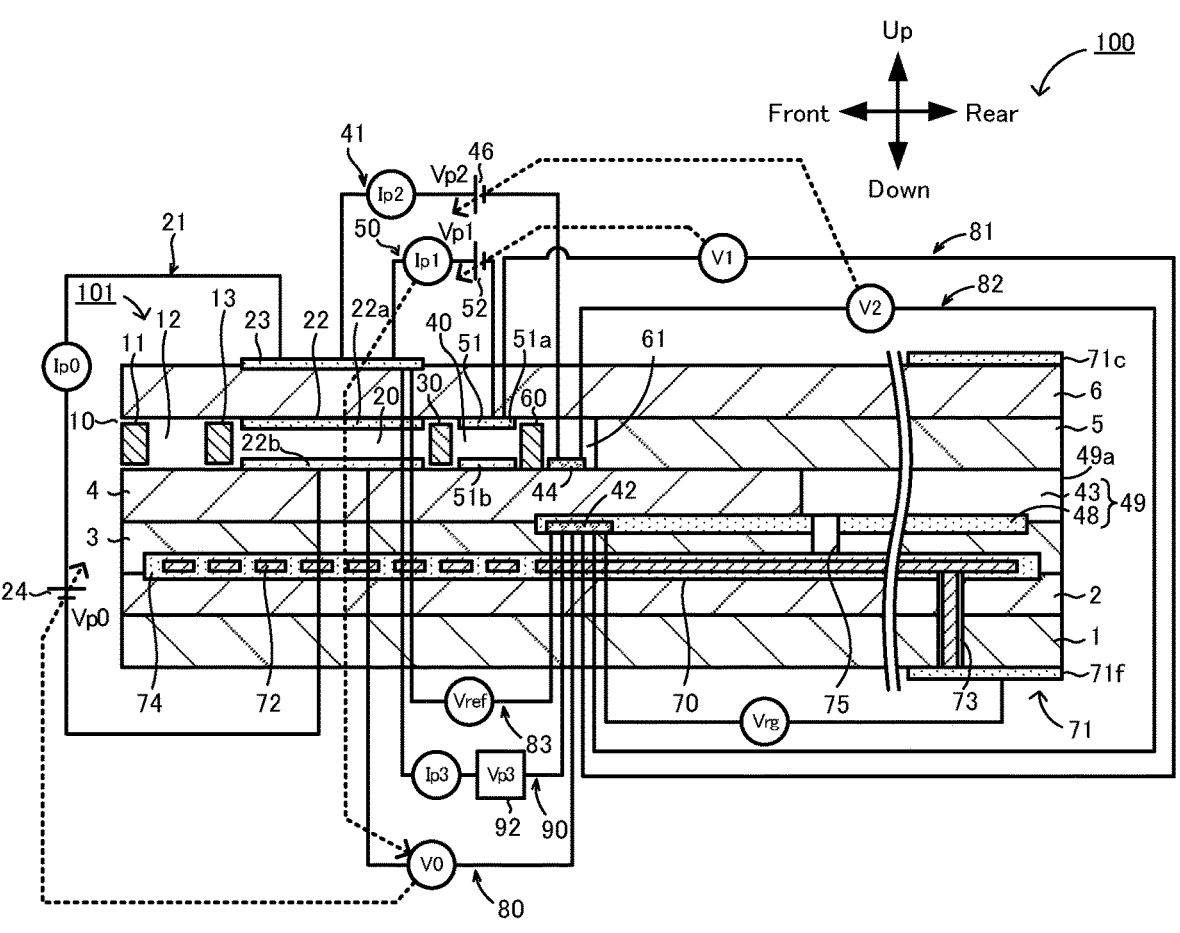
FIG. 1 is a schematic cross-sectional view of a gas sensor 100.
Figure 2:
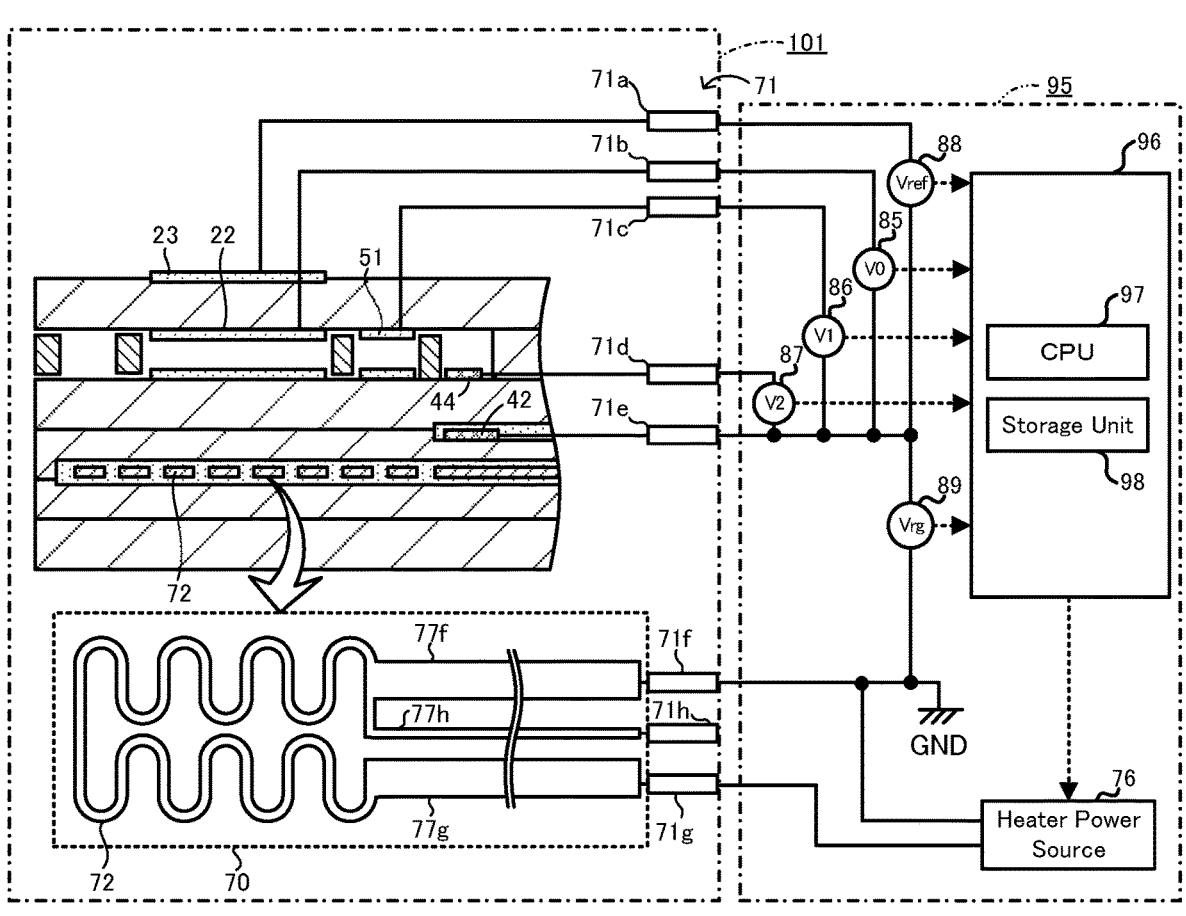
FIG. 2 is a schematic view illustrating the inside of a sensor element 101, the inside of a control device 95, and the wires between the sensor element 101 and the control device 95.
Figure 3:
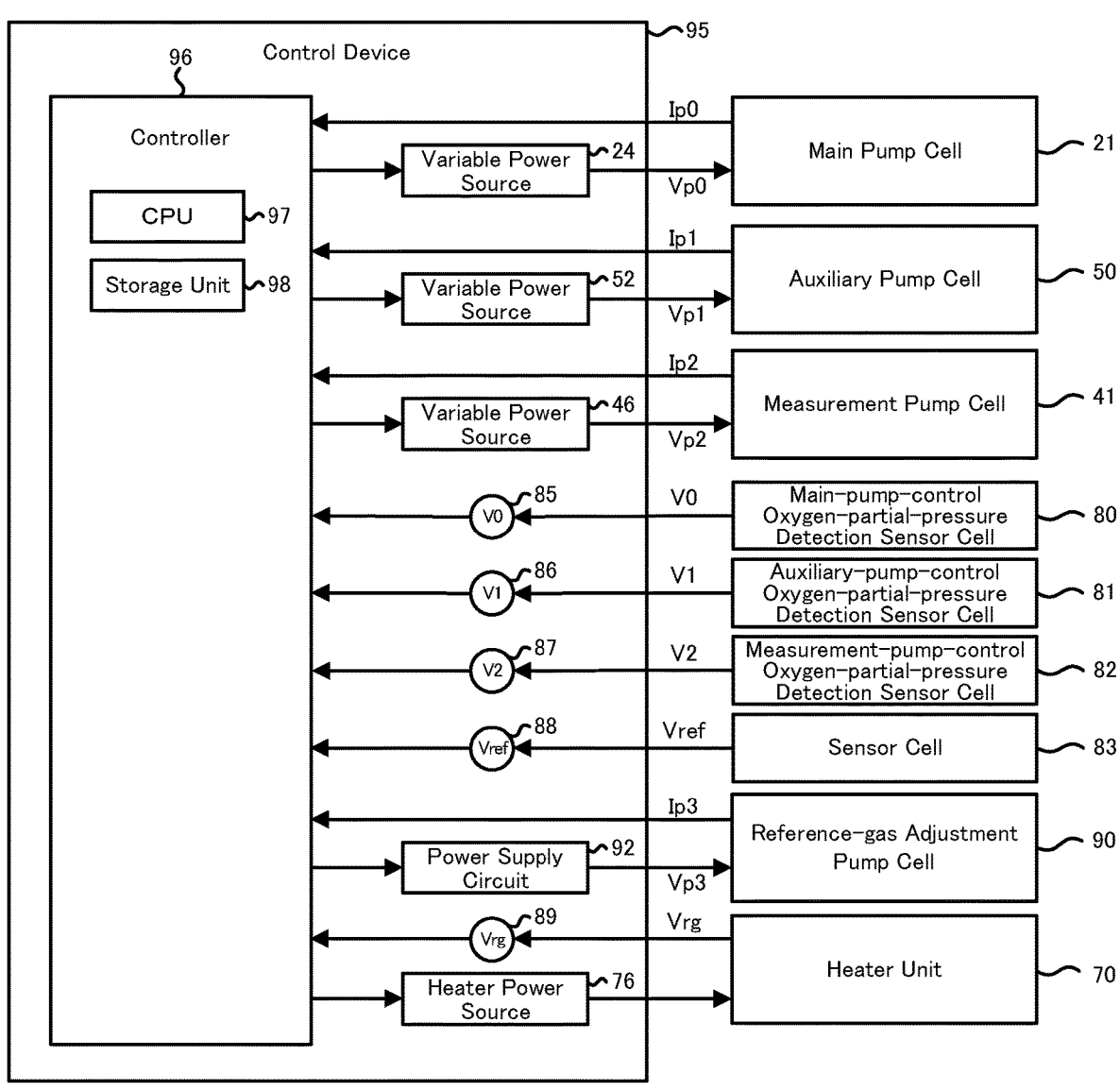
FIG. 3 is a block diagram illustrating an electrical connection relationship between the control device 95, and cells and a heater unit 70.

Next, embodiments of the present invention will be described with reference to the drawings. FIG. 1 is a schematic cross-sectional view illustrating an example of the configuration of a gas sensor 100 that is one embodiment of the present invention. FIG. 2 is a schematic view illustrating the inside of a sensor element 101, the inside of a control device 95, and the wires between the sensor element 101 and the control device 95. FIG. 3 is a block diagram illustrating an electrical connection relationship between the control device 95, and cells and a heater 72. The gas sensor 100 is attached to a pipe such as an exhaust gas pipe of an internal combustion engine, such as a gasoline engine or a diesel engine, for example. The gas sensor 100 detects the concentration of a specific gas, such as NOx or ammonia in a measurement-object gas which is an exhaust gas of an internal combustion engine. In this embodiment, the gas sensor 100 measures the NOx concentration as the specific gas concentration. The gas sensor 100 includes the sensor element 101 in a long rectangular-prismatic shape, cells 15, 21, 41, 50, 80 to 83 constituted by including part of the sensor element 101, a heater unit 70 provided inside the sensor element 101, and the control device 95 that controls the entire gas sensor 100.

The sensor element 101 has a layered body obtained by stacking six layers, namely, a first substrate layer 1, a second substrate layer 2, a third substrate layer 3, a first solid electrolyte layer 4, a spacer layer 5, and a second solid electrolyte layer 6 that are formed of oxygen-ion-conductive solid electrolyte layers composed of, for example, zirconia ($ZrO_2$), in that order from below in the drawing. The solid electrolyte used for forming each of these six layers is dense and hermetic. For example, the sensor element 101 is manufactured by performing predetermining processing and printing of a circuit pattern on ceramic green sheets corresponding to the individual layers, subsequently stacking the sheets, and then combining the sheets by calcination.

At the tip end (i.e., the left end in FIG. 1) of the sensor element 101, a gas inlet 10, a first diffusion controlling section 11, a buffer space 12, a second diffusion controlling section 13, a first internal cavity 20, a third diffusion controlling section 30, a second internal cavity 40, a fourth diffusion controlling section 60, and a third internal cavity 61 are provided next to one another between the lower surface of the second solid electrolyte layer 6 and the upper surface of the first solid electrolyte layer 4 in a communicating manner in that order.

The gas inlet 10, the buffer space 12, the first internal cavity 20, the second internal cavity 40, and the third internal cavity 61 are spaces formed inside the sensor element 101 by hollowing out the spacer layer 5 and each have an upper side defined by the lower surface of the second solid electrolyte layer 6, a lower side defined by the upper surface of the first solid electrolyte layer 4, and lateral sides defined by the side surfaces of the spacer layer 5.

The first diffusion controlling section 11, the second diffusion controlling section 13, and the third diffusion controlling section 30 are each provided as two horizontally-long slits (the openings of which extend longitudinally in a direction orthogonal to the drawing). The fourth diffusion controlling section 60 is provided as a single horizontally-long slit (the opening of which extends longitudinally in the direction orthogonal to the drawing) serving as a gap with respect to the lower surface of the second solid electrolyte layer 6. A portion extending from the gas inlet 10 to the third internal cavity 61 is also referred to as a measurement-object gas flow portion.

The sensor element 101 includes a reference-gas introduction portion 49 that allows the reference gas to flow from outside the sensor element 101 to a reference electrode 42 when the $NO_x$ concentration is to be measured. The reference-gas introduction portion 49 has a reference-gas introduction space 43 and a reference-gas introduction layer 48. The reference-gas introduction space 43 is provided inward from the rear end surface of the sensor element 101. The reference-gas introduction space 43 is provided at a position between the upper surface of the third substrate layer 3 and the lower surface of the spacer layer 5 and has lateral sides defined by the side surfaces of the first solid electrolyte layer 4. The reference-gas introduction space 43 has an opening at the rear end surface of the sensor element 101, and this opening functions as an entrance 49a for the reference-gas introduction portion 49. The reference gas is introduced into the reference-gas introduction space 43 through this entrance 49a. The reference-gas introduction portion 49 introduces the reference gas to the reference electrode 42 while applying a predetermined diffusion resistance to the reference gas introduced through the entrance 49a. In this embodiment, the reference gas is the atmospheric gas.

The reference-gas introduction layer 48 is provided between the upper surface of the third substrate layer 3 and the lower surface of the first solid electrolyte layer 4. The reference-gas introduction layer 48 is a porous body composed of a ceramic material, such as alumina. The upper surface of the reference-gas introduction layer 48 is partially exposed to the reference-gas introduction space 43. The reference-gas introduction layer 48 is provided to cover the reference electrode 42. The reference-gas introduction layer 48 allows the reference gas to flow from the reference-gas introduction space 43 to the reference electrode 42.

The reference electrode 42 is interposed between the upper surface of the third substrate layer 3 and the first solid electrolyte layer 4 and is surrounded by the reference-gas introduction layer 48 connected to the reference-gas introduction space 43, as mentioned above. Furthermore, as will be described later, the reference electrode 42 can be used for measuring the oxygen concentration (oxygen partial pressure) in the first internal cavity 20, the second internal cavity 40, and the third internal cavity 61. The reference electrode 42 is provided as a porous cermet electrode (e.g., a cermet electrode composed of Pt and $ZrO_2$).

In the measurement-object gas flow portion, the gas inlet 10 is open to an external space, such that the measurement-object gas is taken into the sensor element 101 from the external space through the gas inlet 10. The first diffusion controlling section 11 applies a predetermined diffusion resistance to the measurement-object gas taken in through the gas inlet 10. The buffer space 12 is provided for guiding the measurement-object gas introduced by the first diffusion controlling section 11 to the second diffusion controlling section 13. The second diffusion controlling section 13 applies a predetermined diffusion resistance to the measurement-object gas introduced to the first internal cavity 20 from the buffer space 12. When the measurement-object gas is to be introduced to the first internal cavity 20 from outside the sensor element 101, the measurement-object gas quickly taken into the sensor element 101 through the gas inlet 10 due to pressure fluctuation (i.e., pulsation of exhaust pressure if the measurement-object gas is exhaust gas of an automobile) of the measurement-object gas in the external space is not directly introduced to the first internal cavity 20 but is introduced to the first internal cavity 20 after the pressure fluctuation of the measurement-object gas is negated by traveling through the first diffusion controlling section 11, the buffer space 12, and the second diffusion controlling section 13. Accordingly, the pressure fluctuation of the measurement-object gas to be introduced to the first internal cavity 20 can be made substantially negligible. The first internal cavity 20 is provided as a space for adjusting the oxygen partial pressure in the measurement-object gas introduced via the second diffusion controlling section 13. The oxygen partial pressure is adjusted by actuating a main pump cell 21.

The main pump cell 21 is an electrochemical pump cell constituted of an inner pump electrode 22 having a ceiling electrode 22a provided substantially over the entire lower surface of the second solid electrolyte layer 6 facing the first internal cavity 20, an outer pump electrode 23 provided in a region corresponding to the ceiling electrode 22a on the upper surface of the second solid electrolyte layer 6 in a manner such that the outer pump electrode 23 is exposed to the external space, and the second solid electrolyte layer 6 interposed between these electrodes.

The inner pump electrode 22 is provided astride the upper and lower solid electrolyte layers (i.e., the second solid electrolyte layer 6 and the first solid electrolyte layer 4) that define the first internal cavity 20, and the spacer layer 5 that provides sidewalls. In detail, the lower surface of the second solid electrolyte layer 6 that provides a ceiling surface for the first internal cavity 20 is provided with the ceiling electrode 22a, the upper surface of the first solid electrolyte layer 4 that provides a bottom surface is provided with a bottom electrode 22b, and side electrodes (not shown) connecting the ceiling electrode 22a and the bottom electrode 22b are provided on sidewalls (inner surfaces) of the spacer layer 5 that serve as opposite sidewalls for the first internal cavity 20, such that the inner pump electrode 22 is disposed in a tunnel-like structure in a region where the side electrodes are arranged.

The inner pump electrode 22 and the outer pump electrode 23 are provided as porous cermet electrodes (e.g., cermet electrodes composed of Pt and $ZrO_2$ and containing 1% of Au). The inner pump electrode 22 that comes into contact with the measurement-object gas is formed by using a material with a lowered reduction ability against the $NO_x$ component in the measurement-object gas.

In the main pump cell 21, a desired pump voltage Vp0 is applied between the inner pump electrode 22 and the outer pump electrode 23 so that a pump current Ip0 flows in the positive direction or the negative direction between the inner pump electrode 22 and the outer pump electrode 23, whereby the oxygen in the first internal cavity 20 can be pumped out to the external space or the oxygen in the external space can be pumped into the first internal cavity 20.

Furthermore, in order to detect the oxygen concentration (oxygen partial pressure) in the atmosphere within the first internal cavity 20, the inner pump electrode 22, the second solid electrolyte layer 6, the spacer layer 5, the first solid electrolyte layer 4, the third substrate layer 3, and the reference electrode 42 constitute an electrochemical sensor cell, that is, a main-pump-control oxygen-partial-pressure detection sensor cell 80.

The oxygen concentration (oxygen partial pressure) in the first internal cavity 20 can be determined by measuring an electromotive force (voltage V0) in the main-pump-control oxygen-partial-pressure detection sensor cell 80. Furthermore, feedback control is performed on the pump voltage Vp0 of a variable power source 24 so that the voltage V0 becomes a target value, whereby the pump current Ip0 is controlled. Accordingly, the oxygen concentration in the first internal cavity 20 can be maintained at a predetermined fixed value.

The third diffusion controlling section 30 applies a predetermined diffusion resistance to the measurement-object gas, the oxygen concentration (oxygen partial pressure) of which has been controlled in the first internal cavity 20 in accordance with the operation of the main pump cell 21, and guides the measurement-object gas to the second internal cavity 40.

The second internal cavity 40 is provided as a space where an auxiliary pump cell 50 further adjusts the oxygen partial pressure of the measurement-object gas that has preliminarily undergone oxygen concentration (oxygen partial pressure) adjustment in the first internal cavity 20 and that has subsequently been introduced via the third diffusion controlling section 30. Accordingly, the oxygen concentration in the second internal cavity 40 can be maintained at a fixed level with high accuracy, thereby allowing for highly-accurate $NO_x$ concentration measurement in the gas sensor 100.

The auxiliary pump cell 50 is an auxiliary electrochemical pump cell constituted of an auxiliary pump electrode 51 having a ceiling electrode portion 51a provided substantially over the entire lower surface of the second solid electrolyte layer 6 facing the second internal cavity 40, the outer pump electrode 23 (but not limited to the outer pump electrode 23 and may possibly be an appropriate electrode at the outer side of the sensor element 101), and the second solid electrolyte layer 6.

The auxiliary pump electrode 51 is disposed within the second internal cavity 40 in a tunnel-like structure similar to the aforementioned inner pump electrode 22 provided in the first internal cavity 20. Specifically, the tunnel-like structure is provided such that the second solid electrolyte layer 6 that provides a ceiling surface for the second internal cavity 40 is provided with the ceiling electrode portion 51a, the first solid electrolyte layer 4 that provides a bottom surface for the second internal cavity 40 is provided with a bottom electrode 51b, and side electrodes (not shown) that connect the ceiling electrode portion 51a and the bottom electrode 51b are provided on opposite wall surfaces of the spacer layer 5 that provide sidewalls for the second internal cavity 40. The auxiliary pump electrode 51 is similar to the inner pump electrode 22 in being formed by using a material with a lowered reduction ability against the $NO_x$ component in the measurement-object gas.

In the auxiliary pump cell 50, a desired voltage Vp1 is applied between the auxiliary pump electrode 51 and the outer pump electrode 23 so that the oxygen in the atmosphere within the second internal cavity 40 can be pumped out to the external space or the oxygen can be pumped into the second internal cavity 40 from the external space.

Furthermore, in order to control the oxygen partial pressure in the atmosphere within the second internal cavity 40, the auxiliary pump electrode 51, the reference electrode 42, the second solid electrolyte layer 6, the spacer layer 5, the first solid electrolyte layer 4, and the third substrate layer 3 constitute an electrochemical sensor cell, that is, an auxiliary-pump-control oxygen-partial-pressure detection sensor cell 81.

The auxiliary pump cell 50 performs pumping in accordance with a variable power source 52 that is voltage-controlled based on an electromotive force (voltage V1) detected by the auxiliary-pump-control oxygen-partial-pressure detection sensor cell 81. Accordingly, the oxygen partial pressure in the atmosphere within the second internal cavity 40 is controlled to a low partial pressure that substantially has no effect on $NO_x$ measurement.

In addition, a pump current Ip1 is used for controlling the electromotive force of the main-pump-control oxygen-partial-pressure detection sensor cell 80. In detail, the pump current Ip1 is input as a control signal to the main-pump-control oxygen-partial-pressure detection sensor cell 80, and the voltage V0 is controlled to the aforementioned target value, whereby the gradient of the oxygen partial pressure in the measurement-object gas introduced to the second internal cavity 40 from the third diffusion controlling section 30 is controlled such that the gradient is constantly fixed. When the gas sensor 100 is used as a $NO_x$ sensor, the oxygen concentration within the second internal cavity 40 is maintained at a fixed value of about 0.001 ppm in accordance with the functions of the main pump cell 21 and the auxiliary pump cell 50.

The fourth diffusion controlling section 60 applies a predetermined diffusion resistance to the measurement-object gas, the oxygen concentration (oxygen partial pressure) of which has been controlled in the second internal cavity 40 in accordance with the operation of the auxiliary pump cell 50, and guides the measurement-object gas to the third internal cavity 61. The fourth diffusion controlling section 60 has a role of limiting the amount of $NO_x$ flowing into the third internal cavity 61.

The third internal cavity 61 is provided as a space where a process for measuring the nitrogen oxide ($NO_x$) concentration in the measurement-object gas is performed on the measurement-object gas that has preliminarily undergone oxygen concentration (oxygen partial pressure) adjustment in the second internal cavity 40 and that has subsequently been introduced via the fourth diffusion controlling section 60. The $NO_x$ concentration is measured mainly in the third internal cavity 61 in accordance with the operation of a measurement pump cell 41.

The measurement pump cell 41 measures the $NO_x$ concentration in the measurement-object gas within the third internal cavity 61. The measurement pump cell 41 is an electrochemical pump cell constituted of a measurement electrode 44 provided on the upper surface of the first solid electrolyte layer 4 facing the third internal cavity 61, the outer pump electrode 23, the second solid electrolyte layer 6, the spacer layer 5, and the first solid electrolyte layer 4. The measurement electrode 44 is a porous cermet electrode composed of a material with a higher reduction ability against the $NO_x$ component in the measurement-object gas than the inner pump electrode 22. The measurement electrode 44 also functions as a $NO_x$ reduction catalyst that reduces the $NO_x$ existing in the atmosphere within the third internal cavity 61.

In the measurement pump cell 41, oxygen produced as a result of decomposition of the nitrogen oxide in the atmosphere surrounding the measurement electrode 44 is pumped out, and the amount of oxygen produced can be detected as a pump current Ip2.

Furthermore, in order to detect the oxygen partial pressure around the measurement electrode 44, the first solid electrolyte layer 4, the third substrate layer 3, the measurement electrode 44, and the reference electrode 42 constitute an electrochemical sensor cell, that is, a measurement-pump-control oxygen-partial-pressure detection sensor cell 82. A variable power source 46 is controlled based on an electromotive force (voltage V2) detected by the measurement-pump-control oxygen-partial-pressure detection sensor cell 82.

The measurement-object gas introduced to the second internal cavity 40 reaches the measurement electrode 44 in the third internal cavity 61 via the fourth diffusion controlling section 60 under a condition where the oxygen partial pressure is controlled. The nitrogen oxide in the measurement-object gas surrounding the measurement electrode 44 is reduced ($2NO \rightarrow N_2 + O_2$), so that oxygen is produced. Then, the produced oxygen is to undergo pumping by the measurement pump cell 41. During the pumping of the oxygen, a voltage Vp2 of the variable power source 46 is controlled such that the voltage V2 detected by the measurement-pump-control oxygen-partial-pressure detection sensor cell 82 is a fixed value (i.e., a target value). Because the amount of oxygen produced around the measurement electrode 44 is proportional to the concentration of the nitrogen oxide in the measurement-object gas, the nitrogen oxide concentration in the measurement-object gas is calculated by using the pump current Ip2 in the measurement pump cell 41.

Furthermore, the second solid electrolyte layer 6, the spacer layer 5, the first solid electrolyte layer 4, the third substrate layer 3, the outer pump electrode 23, and the reference electrode 42 constitute an electrochemical sensor cell 83. The oxygen partial pressure in the measurement-object gas outside the sensor can be detected in accordance with an electromotive force (voltage Vref) obtained by the sensor cell 83.

Moreover, the second solid electrolyte layer 6, the spacer layer 5, the first solid electrolyte layer 4, the third substrate layer 3, the outer pump electrode 23, and the reference electrode 42 constitute an electrochemical reference-gas adjustment pump cell 90. The reference-gas adjustment pump cell 90 performs oxygen pumping by receiving a control current (pump current Ip3) flowing in accordance with a control voltage (voltage Vp3) applied by a power supply circuit 92 connected between the outer pump electrode 23 and the reference electrode 42. Accordingly, the reference-gas adjustment pump cell 90 can pump in the oxygen from the periphery of the outer pump electrode 23 to the periphery of the reference electrode 42 or pump out the oxygen from the periphery of the reference electrode 42 to the periphery of the outer pump electrode 23.

In the gas sensor 100 having the above configuration, the measurement pump cell 41 receives the measurement-object gas whose oxygen partial pressure is constantly maintained at a fixed low value (i.e., a value that substantially has no effect on $NO_x$ measurement) as a result of actuation of the main pump cell 21 and the auxiliary pump cell 50. Thus, the $NO_x$ concentration in the measurement-object gas can be ascertained based on the pump current Ip2 flowing as a result of oxygen produced by $NO_x$ reduction being pumped out by the measurement pump cell 41 substantially in proportion to the $NO_x$ concentration in the measurement-object gas.

Furthermore, in order to enhance oxygen ion conductivity of the solid electrolyte, the sensor element 101 includes a heater unit 70 having a role of temperature adjustment for keeping the sensor element 101 warm by heating the sensor element 101. The heater unit 70 includes a heater 72, a heater insulation layer 74, and a pressure release hole 75.

The heater 72 is an electrical resistor interposed between the second substrate layer 2 and the third substrate layer 3 from above and below. The heater 72 generates heat by being supplied with electricity from a heater power source 76 (see FIGS. 2, 3), thereby heating and maintaining the temperature of the solid electrolyte constituting the sensor element 101.

Furthermore, the heater 72 is embedded in the entire region from the first internal cavity 20 to the third internal cavity 61, and is capable of adjusting the entire sensor element 101 to a temperature at which the aforementioned solid electrolyte is activated.

The heater insulation layer 74 is an insulation layer provided on the upper and lower surfaces of the heater 72 and formed of an insulator composed of, for example, alumina. The heater insulation layer 74 is provided for the purpose of obtaining electrical insulation between the second substrate layer 2 and the heater 72, as well as electrical insulation between the third substrate layer 3 and the heater 72.

The pressure release hole 75 is provided to extend through the third substrate layer 3 and the reference-gas introduction layer 48 and to communicate with the reference-gas introduction space 43, and is formed for the purpose of alleviating an increase in internal pressure occurring due to a temperature increase in the heater insulation layer 74.

A connector electrode 71 is disposed at the rear end of the sensor element 101. The connector electrode 71 includes connector electrodes 71a to 71d disposed at the rear end of the upper surface of the sensor element 101, and connector electrodes 71e to 71h disposed at the rear end of the lower surface of the sensor element 101. The connector electrode 71 functions as a terminal for electrically connecting the sensor element 101 and the outside. The connector electrodes 71a to 71e are conductive with the outer pump electrode 23, the inner pump electrode 22, the auxiliary pump electrode 51, the measurement electrode 44 and the reference electrode 42 via leads disposed inside the sensor element 101 in a one-to-one manner (see FIG. 2). One end of the heater 72 is connected to the connector electrode 71f via a conduction lead 77f disposed inside the sensor element 101. The other end of the heater 72 is connected to the connector electrode 71g via a conduction lead 77g disposed inside the sensor element 101. Since the conduction lead 77f is schematically illustrated in FIG. 2, illustration is omitted, but the conduction lead 77f also includes the conductors in the through-hole 73 of FIG. 1. In addition, a voltage measurement lead 77h is also connected to one end of the heater 72 in parallel with the conduction lead 77f, and the one end of the heater 72 and the connector electrode 71h are connected via the voltage measurement lead 77h. As illustrated in FIG. 2, the connector electrode 71f is connected to the ground (GND). The connector electrode 71f is an example of a ground terminal. The electrical potential of the ground (GND) is used as a reference of the electrical potential of the circuits in the control device 95. It is preferable that the ground (GND) be short-circuited (earthed).

As illustrated in FIG. 3, the control device 95 includes the aforementioned variable power sources 24, 46, 52, a power source circuit 92, a heater power source 76, a main pump voltage acquisition unit 85, an auxiliary pump voltage acquisition unit 86, a measurement voltage acquisition unit 87, a voltage acquisition unit 88, a reference electrode voltage acquisition unit 89, and a controller 96.

As illustrated in FIG. 2, the main pump voltage acquisition unit 85 is connected to each of the connector electrode 71b and the connector electrode 71e via a lead. Thus, the main pump voltage acquisition unit 85 acquires the voltage across the inner pump electrode 22 and the reference electrode 42, specifically, the voltage V0 of the aforementioned main-pump-control oxygen-partial-pressure detection sensor cell 80. Similarly, the auxiliary pump voltage acquisition unit 86 is connected to each of the connector electrode 71c and the connector electrode 71e to acquire voltage V1 across the auxiliary pump electrode 51 and the reference electrode 42 of the auxiliary-pump-control oxygen-partial-pressure detection sensor cell 81. The measurement voltage acquisition unit 87 is connected to each of the connector electrode 71d and the connector electrode 71e to acquire voltage V2 across the measurement electrode 44 and the reference electrode 42 of the measurement-pump-control oxygen-partial-pressure detection sensor cell 82. The voltage acquisition unit 88 is connected to each of the connector electrode 71a and the connector electrode 71e to acquire voltage Vref across the outer pump electrode 23 and the reference electrode 42 of the sensor cell 83.

The reference electrode voltage acquisition unit 89 is connected to each of the connector electrode 71f and the connector electrode 71e by a lead. Thus, the reference electrode voltage acquisition unit 89 acquires voltage Vrg across the connector electrode 71f and the reference electrode 42. As described above, the connector electrode 71f is connected to the ground, thus the voltage Vrg acquired by the reference electrode voltage acquisition unit 89 is the voltage across the ground and reference electrode 42.

As illustrated in FIG. 2, the heater power source 76 is connected to each of the connector electrode 71f and the connector electrode 71g via a lead, and applies a voltage across the connector electrodes 71f, 71g to supply electric power to the heater 72. Since the connector electrode 71f is connected to the ground, the connector electrode 71f is an electrode on the low potential side, and the connector electrode 71g is an electrode on the high potential side. Note that the reference electrode voltage acquisition unit 89 and the heater power source 76 are each connected to the connector electrode 71f, and as illustrated in FIG. 2, the connection position between the reference electrode voltage acquisition unit 89 and the connector electrode 71f is closer to the ground than the connection position between the heater power source 76 and the connector electrode 71f. Thus, a heater current which flows between the heater power source 76 and the heater 72 does not flow through the circuit for acquiring the voltage Vrg by the reference electrode voltage acquisition unit 89, that is, the electric circuit from the connector electrode 71e to the ground.

Note that although wires are not illustrated in FIG. 2, the variable power sources 24, 52, 46 illustrated in FIGS. 1, 3 and the power supply circuit 92 are also actually connected to electrodes in the sensor element 101 via the connector electrode 71. As with the voltage acquisition units 85 to 89, the aforementioned pump currents Ip0, Ip1, Ip2, Ip3 are also actually acquired (measured) via the connector electrode 71 by current acquisition units which are not illustrated and connected to electrodes inside the sensor element 101.

The controller 96 is a microprocessor including a CPU 97 and a storage unit 98. The storage unit 98 is a non-volatile memory capable of rewriting information, and can store, for example, various programs and various data. The controller 96 receives input of the voltages V0, V1, V2, Vref, Vrg acquired by the aforementioned voltage acquisition units 85 to 89. The controller 96 receives input of the pump currents Ip0, Ip1, Ip2, Ip3 acquired by current acquisition units which are not illustrated. In addition, the controller 96 controls the voltages Vp0, Vp1, Vp2, Vp3 output by the variable power sources 24, 46, 52 and the power supply circuit 92 by outputting a control signal to the variable power sources 24, 46, 52 and the power supply circuit 92, thereby controlling the main pump cell 21, the measurement pump cell 41, the auxiliary pump cell 50 and the reference-gas adjustment pump cell 90. The controller 96 controls the electric power supplied by the heater power source 76 to the heater 72 by outputting a control signal to the heater power source 76, thereby adjusting the temperature of the sensor element 101. The storage unit 98 also stores the later-described target values V0*, V1*, V2*. The CPU 97 of the controller 96 refers to these target values V0*, V1*, V2* to control the cells 21, 41, 50.

The controller 96 performs an auxiliary pump control process of controlling the auxiliary pump cell 50 so that the oxygen concentration in the second internal cavity 40 becomes a target concentration. In detail, the controller 96 controls the auxiliary pump cell 50 by performing feedback control on the voltage Vp1 of the variable power source 52 so that the voltage V1 becomes a fixed value (referred to as a target value V1*). The target value V1* is determined as a value at which the oxygen concentration in the second internal cavity 40 becomes a predetermined low concentration that substantially has no effect on the measurement of NOx.

The controller 96 performs a main pump control process of controlling the main pump cell 21 so that the pump current Ip1 flowing when the auxiliary pump cell 50 adjusts the oxygen concentration in the second internal cavity 40 by the auxiliary pump control process becomes a target current (referred to as a target current Ip1*). In detail, the controller 96 sets (i.e., performs feedback control on) the target value (referred to as a target value V0*) of the voltage V0 based on the pump current Ip1 so that the pump current Ip1 flowing in accordance with the voltage Vp1 becomes the fixed target current Ip1*. The controller 96 performs feedback control on the voltage Vp0 of the variable power source 24 so that the voltage V0 becomes the target value V0* (i.e., so that the oxygen concentration in the first internal cavity 20 becomes a target concentration). By this main pump control process, the gradient of the oxygen partial pressure in the measurement-object gas introduced to the second internal cavity 40 from the third diffusion controlling section 30 is constantly fixed. The target value V0* is set to a value at which the oxygen concentration in the first internal cavity 20 is higher than 0% and becomes a low concentration. The pump current Ip0 flowing during the main pump control process changes in accordance with the oxygen concentration in the measurement-object gas flowing into the measurement-object gas flow portion through the gas inlet 10 (i.e., the measurement-object gas around the sensor element 101). Thus, the controller 96 can also detect the oxygen concentration in the measurement-object gas based on the pump current Ip0.

The main pump control process and the auxiliary pump control process described above are also collectively referred to as an adjustment pump control process. The first internal cavity 20 and the second internal cavity 40 are also collectively referred to as an oxygen-concentration adjustment chamber. The main pump cell 21 and the auxiliary pump cell 50 are also collectively referred to as an adjustment pump cell. When the controller 96 performs the adjustment pump control process, the adjustment pump cell adjusts the oxygen concentration in the oxygen-concentration adjustment chamber.

Furthermore, the controller 96 performs a measurement pump control process of controlling the measurement pump cell 41 so that the voltage V2 becomes a fixed value (referred to as a target value V2*) (i.e., so that the oxygen concentration in the third internal cavity 61 becomes a predetermined low concentration). In detail, the controller 96 controls the measurement pump cell 41 by performing feedback control on the voltage Vp2 of the variable power source 46 so that the voltage V2 becomes the target value V2*. By performing this measurement pump control process, oxygen is pumped out from the third internal cavity 61.

By performing the measurement pump control process, oxygen is pumped out from the third internal cavity 61 so that the oxygen produced by the reduction of NOx in the measurement-object gas in the third internal cavity 61 becomes substantially zero. Then, the controller 96 acquires the pump current Ip2 as a detection value according to the oxygen produced in the third internal cavity 61 from a specific gas (in this case, NOx), and calculates the NOx concentration in the measurement-object gas based on the pump current Ip2.

The storage unit 98 stores therein, for example, a relational expression (e.g., a linear function expression or a quadratic function expression) or a map as a correspondence relationship between the pump current Ip2 and the NOx concentration. Such a relational expression or a map can be preliminarily obtained from experiments.

The controller 96 performs a reference-gas adjustment process for controlling the reference-gas adjustment pump cell 90 so that oxygen is pumped into the periphery of the reference electrode 42 from the periphery of the outer pump electrode 23 or oxygen is pumped out from the periphery of the reference electrode 42 to the periphery of the outer pump electrode 23. The oxygen concentration around the reference electrode 42 is adjusted by the reference-gas adjustment process. In the reference-gas adjustment process, the controller 96 causes the pump current Ip3 to flow through the reference-gas adjustment pump cell 90 by controlling the power supply circuit 92 so that the voltage Vp3 is applied to the reference-gas adjustment pump cell 90. The voltage Vp3 may be a DC voltage so that the pump current Ip3 has a predetermined value (DC current having a constant value), or may be a voltage (e.g., a pulse voltage) that is repeatedly turned on and off. The controller 96 controls the magnitude (in other words, the movement amount of oxygen) of the pump current Ip3 and the direction of flow (in other words, the movement direction of oxygen between the outer pump electrode 23 and the reference electrode 42) of the pump current Ip3 by changing the magnitude and the positive or negative of the voltage Vp3. When the voltage Vp3 is a voltage that is repeatedly turned on and off, the movement amount of oxygen can also be adjusted by a duty ratio (Ton/T) that is a ratio of a cycle T of repetition to an on-time Ton. In this embodiment, the voltage Vp3 is a pulse voltage, and the controller 96 controls the movement amount and the movement direction of oxygen by changing the duty ratio and the positive or negative of the voltage Vp3. The controller 96 adjusts the oxygen concentration around the reference electrode 42 by performing the reference-gas adjustment process.

The controller 96 performs a heater control process for controlling the heater power source 76 so that the temperature of the heater 72 reaches a target temperature. The temperature of the heater 72 can be expressed by a linear function of the resistance value of the heater 72, thus in the heater control process, the controller 96 controls the heater power source 76 so that the resistance value of the heater 72 reaches a target resistance value. When the heater control process is started, the CPU 97 of the controller 96 first controls the heater power source 76 and starts energization to the heater 72 to cause the heater 72 to generate heat. The CPU 97 then derives the resistance value of the heater 72 by a three-terminal method. Specifically, the CPU 97 first acquires, via voltage acquisition units and current acquisition unis which are not illustrated and included in the control device 95, a first heater voltage Vh1 across the connector electrode 71h and the connector electrode 71g, a second heater voltage Vh2 across the connector electrode 71h and the connector electrode 71f, and a heater current Ih which is caused to flow through the heater 72 by the electric power supplied from the heater power source 76. Subsequently, the CPU 97 derives a heater voltage Vh using a relational expression of Vh=Vh1−Vh2, the heater voltage Vh being the voltage across both ends of the heater 72 and not including a voltage drop of the conduction lead 77f and the conduction lead 77g. The CPU 97 then derives the resistance value of the heater 72 by dividing the heater voltage Vh by the heater current Ih. The controller 96 then feedback-controls the electric power supplied by the heater power source 76 by outputting a control signal to the heater power source 76 so that the derived resistance value of the heater 72 reaches a target resistance value. The heater power source 76 adjusts the electric power supplied to the heater 72, for example, by changing the value of a voltage to be applied to the heater 72.

An example of a NOx concentration detection process for detecting the NOx concentration in the measurement-object gas performed by the controller 96 of thus configured gas sensor 100 will be described below. Before starting the NOx concentration detection process, the CPU 97 of the controller 96 first starts the aforementioned heater control process to control the heater 72 so that the temperature of the heater 72 reaches a target temperature (e.g., 800° C.) The temperature of the heater 72 is also affected by the temperature of the measurement-object gas, thus the CPU 97 continues to perform the heater control process even after the start of the NOx concentration detection process. When the temperature of the heater 72 reaches close to a target temperature, the CPU 97 starts the NOx concentration detection process. In the NOx concentration detection process, the CPU 97 first starts acquisition of the voltages V0, V1, V2, Vref from the aforementioned sensor cells 80 to 83, and control of the aforementioned pump cells 21, 41, 50, specifically, the adjustment pump control process and the measurement pump control process. When the measurement-object gas is introduced through the gas inlet 10 in this state, the measurement-object gas passes through the first diffusion controlling section 11, the buffer space 12, and the second diffusion controlling section 13 in that order and reaches the first internal cavity 20. Next, the oxygen concentration in the measurement-object gas is adjusted by the main pump cell 21 and the auxiliary pump cell 50 in the first internal cavity 20 and the second internal cavity 40, and the measurement-object gas after the adjustment reaches the third internal cavity 61. The CPU 97 then detects the NOx concentration in the measurement-object gas based on the acquired pump current Ip2 and a correspondence relationship stored in the storage unit 98. The CPU 97 transmits the value of the detected NOx concentration to an engine ECU which is not illustrated, and ends the NOx concentration detection process. The CPU 97 may perform the NOx concentration detection process, for example, at a timing for every predetermined time interval, or at a timing when detection of the NOx concentration is commanded from the engine ECU.

Here, as seen from FIG. 2, the voltages V0 to V2, Vref detected by the voltage acquisition units 85 to 88 of the control device 95 are the voltages across the reference electrode 42 and the electrodes 22, 51, 44, 23. The electrical potential of the reference electrode 42, in short, the reference potential has a value corresponding to the oxygen concentration around the reference electrode 42. Since the reference gas is introduced into the reference electrode 42 through the reference-gas introduction portion 49, when the oxygen concentration in the reference gas is constant, the oxygen concentration around the reference electrode 42 is basically constant. However, the oxygen concentration around the reference electrode 42 may actually change during use of the sensor element 101. For example, in the gas sensor 100, the periphery of the front-end side of the sensor element 101 and the periphery of the rear-end side are sealed by a sensor assembly which is not illustrated so that the measurement-object gas present in the periphery of the front-end side of the sensor element 101 and the reference gas present in the periphery of the rear-end side of the sensor element 101 do not pass to each other. However, when the pressure of the measurement-object gas is high, the measurement-object gas may slightly enter the reference gas, and the oxygen concentration around the reference electrode 42 may decrease. In addition, the reference-gas introduction portion 49 may adsorb external water during a time period when the sensor element 101 is not driven, and when the sensor element 101 is started to be driven, the sensor element 101 is heated and the water within the reference-gas introduction portion 49 turns into a gas and is released to the outside of the sensor element 101. However, the oxygen concentration around the reference electrode 42 may decrease because gaseous water is present until the water is released. When the oxygen concentration around the reference electrode 42 changes in this manner, the reference potential of the reference electrode 42 deviates, and the values of the voltages V0 to V2, Vref also change, thus the accuracy of detection of the NOx concentration decreases.

Thus, in the gas sensor 100 in this embodiment, the controller 96 performs a reference potential adjustment process for adjusting the reference potential by identifying the deviation of the reference potential of the reference electrode 42. FIG. 4 is a flowchart illustrating an example of a reference potential adjustment process routine executed by the controller 96. The controller 96 stores this routine, for example, in the storage unit 98. The controller 96 repeatedly executes this routine, for example, every elapse of a predetermined time.

When the reference potential adjustment process routine is started, the CPU 97 of the controller 96 first receives input of the voltage Vrg acquired by the reference electrode voltage acquisition unit 89 (step S100). In other words, the CPU 97 measures the voltage Vrg across the ground and the reference electrode 42. Since the electrical potential of the ground is basically constant, the voltage Vrg has a value corresponding to the oxygen concentration around the reference electrode 42. Subsequently, the CPU 97 compares the value of the input voltage Vrg with a predetermined acceptable range of the voltage Vrg to determine whether the voltage Vrg is within the acceptable range (step S110). The predetermined acceptable range is determined in advance as a range including a normal value and a value close to a normal value of the voltage Vrg, and is stored in the storage unit 98. The normal value of the voltage Vrg is, for example, the value of the voltage Vrg when the oxygen concentration around the reference electrode 42 matches the normal oxygen concentration (in this case, the atmospheric oxygen concentration) of the reference gas. The upper and lower limits of acceptable range have little effect, for example, on the accuracy of measurement of the NOx concentration, thus can be determined in advance based on the upper and lower limits of range of the voltage Vrg which allows deviation of the reference potential, in other words, the upper and lower limits of acceptable range of the oxygen concentration around the reference electrode 42. The process of determining whether the voltage Vrg is within an acceptable range corresponds to the process of identifying the deviation of the reference potential. The differences between a normal value and the upper and lower limits of acceptable range of the voltage Vrg correspond to the upper and lower limits of acceptable range of deviation of the reference potential. The difference or ratio between a measured voltage Vrg and a normal value is a value that represents the deviation of the reference potential; thus, the CPU 97 may make a determination in step S110 by comparing the difference or ratio with an acceptable range of the difference or ratio. Note that in this embodiment, the voltage Vrg is defined as the electrical potential of the reference electrode 42 relative to the ground, and the voltage Vrg has a positive value regardless of the magnitude of the oxygen concentration around the reference electrode 42. However, for example, the voltage Vrg may be defined to have a negative value, and in this case, the absolute value of the voltage Vrg may be compared with the acceptable range of the voltage Vrg.

In contrast, when the voltage Vrg is higher than the acceptable range in step S110, in other words, when the deviation of the reference potential occurs such that the oxygen concentration around the reference electrode 42 is higher than the upper limit of acceptable range, the CPU 97 controls the reference-gas adjustment pump cell 90 so that oxygen is pumped out from the periphery of the reference electrode 42 into the periphery of the outer pump electrode 23 (step S120). Consequently, the oxygen concentration around the reference electrode 42 decreases, thus the voltage Vrg can be set within the acceptable range. Specifically, when the reference potential of the reference electrode 42 deviates to a value higher than the upper limit of acceptable range, the CPU 97 controls the reference-gas adjustment pump cell 90 so that the reference potential is decreased to be within the acceptable range.

When the voltage Vrg is lower than the acceptable range in step S110, in other words, when the deviation of the reference potential occurs such that the oxygen concentration around the reference electrode 42 is lower than the lower limit of acceptable range, the CPU 97 controls the reference-gas adjustment pump cell 90 so that oxygen is pumped into the periphery of the reference electrode 42 from the periphery of the outer pump electrode 23 (step S130). Consequently, the oxygen concentration around the reference electrode 42 increases, thus the voltage Vrg can be set within the acceptable range. Specifically, when the reference potential of the reference electrode 42 deviates to a value lower than the lower limit of acceptable range, the CPU 97 controls the reference-gas adjustment pump cell 90 so that the reference potential is increased to be within the acceptable range.

When the voltage Vrg is within the acceptable range in step S110, in other words, when the deviation of the reference potential is within the acceptable range, the CPU 97 ends this routine. The CPU 97 ends this routine after execution of step S120, or after execution of step S130.

Execution of the reference potential adjustment process routine allows the oxygen concentration around the reference electrode 42 to be adjusted based on a determination result (in other words, a result of identification of the deviation of the reference potential) of step S110, and the deviation of the reference potential from a normal value is reduced, thus decrease in the accuracy of detection of the NOx concentration caused by the deviation of the reference potential can be prevented. In this embodiment, as described above the CPU 97 adjusts the amount of pumped-out oxygen in step S120 and the amount of pumped-in oxygen in step S130 by changing the duty ratio of the voltage Vp3 which is a pulse voltage. The CPU 97 may determine the pumped-out amount and the pumped-in amount, for example, as values which increase as the difference or ratio (in other words, the deviation amount of the reference potential) increases between the value of the input voltage Vrg in step S100 and a normal value of the voltage Vrg. In other words, the CPU 97 may determine the control amount (in this case, the duty ratio of the voltage Vp3) of the reference-gas adjustment pump cell 90 in step S120 and step S130 as a value corresponding to the movement mount of oxygen required to change the value of the input voltage Vrg in step S100 to a normal value or a value close to a normal value. A correspondence relationship between the value of the input voltage Vrg in step S100 and the control amount of the reference-gas adjustment pump cell 90, or a correspondence relationship between the difference or ratio between the voltage Vrg and a normal value, and the control amount of the reference-gas adjustment pump cell 90 may be determined in advance and stored in the storage unit 98, and the CPU 97 may determine the control amount of the reference-gas adjustment pump cell 90 based on this correspondence relationship. Instead of using the duty ratio of the voltage Vp3 as the control amount of the reference-gas adjustment pump cell 90 or in addition to the duty ratio of the voltage Vp3, the magnitude of the voltage Vp3 may be used, or the operation time of the reference-gas adjustment pump cell 90 may be used. That is, the CPU 97 may adjust the movement amount of oxygen with the magnitude of the voltage Vp3, or may adjust the movement amount of oxygen with the length of the operation time of the reference-gas adjustment pump cell 90.

The amount of pumped-out oxygen in step S120 and the amount of pumped-in oxygen in step S130 may be constant values. Also, in this case, the voltage Vrg can be set within the acceptable range by repeated execution of the reference potential adjustment process routine, thus the deviation of the reference potential can be reduced. In this case, the CPU 97 repeatedly executes measurement of the voltage Vrg and control of the reference-gas adjustment pump cell 90 until the voltage Vrg falls within the acceptable range by repeatedly executing the reference potential adjustment process routine.

The measurement of the voltage Vrg in step S100 is preferably made at a timing when no pump current Ip3 flows through the reference electrode 42. In this manner, inclusion of a voltage drop in the voltage Vrg due to the pump current Ip3 can be prevented, and the voltage Vrg has a more accurate value corresponding to the oxygen concentration around the reference electrode 42. For example, when the voltage Vp3 is a pulse voltage, the CPU 97 preferably measures the voltage Vrg in a time period when the voltage Vp3 is off. Alternatively, the CPU 97 may control the power supply circuit 92 so that the voltage Vp3 is not applied when the voltage Vrg is measured. The same applies when the voltages V0 to V2, Vref are measured.

The correspondence relationship between the components in this embodiment and the components in the present invention will now be clarified. The sensor element 101 of this embodiment corresponds to a sensor element of the present invention, a layered body obtained by stacking six layers, namely, the first substrate layer 1, the second substrate layer 2, the third substrate layer 3, the first solid electrolyte layer 4, the spacer layer 5, and the second solid electrolyte layer 6 correspond to an element body, the third internal cavity 61 corresponds to a measurement chamber, the measurement electrode 44 corresponds to a measurement electrode, the reference electrode 42 corresponds to a reference electrode, and the control device 95 corresponds to a control device. In addition, the outer pump electrode 23 corresponds to a measurement-object-gas side electrode and an outer measurement electrode, the voltage V2 corresponds to a measurement voltage, and the target value V2* corresponds to a measurement voltage target value. The first internal cavity 20 and the second internal cavity 40 correspond to an oxygen concentration adjustment chamber, the auxiliary pump electrode 51 corresponds to an inner adjustment electrode, the main pump cell 21 and the auxiliary pump cell 50 correspond an adjustment pump cell, the voltage V1 corresponds to an adjustment voltage, the target value V1* corresponds to an adjustment voltage target value, the connector electrode 71f corresponds to a ground terminal, and the heater 72 corresponds to a heater. Note that in this embodiment, an example of a method of identifying the deviation of the reference potential of the gas sensor of the present invention is also clarified by describing the operation of the gas sensor 100.

With the gas sensor 100 in this embodiment described above, the control device 95 measures the voltage Vrg across the ground and the reference electrode 42, and identifies the deviation of the reference potential that is the electrical potential of the reference electrode 42 based on the voltage Vrg. Since the voltage Vrg changes with change in the oxygen concentration around the reference electrode 42, in other words, with change in the reference potential, the deviation of the reference potential can be identified based on the voltage Vrg.

In addition, the sensor element 101 includes the reference-gas adjustment pump cell 90 constituted by including the outer pump electrode 23 and the reference electrode 42, the outer pump electrode 23 being provided in the element body to come into contact with the measurement-object gas. When the measured voltage Vrg is higher than the acceptable range, the control device 95 controls the reference-gas adjustment pump cell 90 so that oxygen is pumped out from the periphery of the reference electrode 42 into the periphery of the outer pump electrode 23. When the measured voltage Vrg is lower than the acceptable range, the control device 95 controls the reference-gas adjustment pump cell 90 so that oxygen is pumped into the periphery of the reference electrode 42 from the periphery of the outer pump electrode 23. Consequently, the oxygen concentration around the reference electrode 42 can be adjusted according to the deviation of the reference potential, thus decrease in the accuracy of detection of the NOx concentration caused by the deviation of the reference potential can be prevented by reducing the deviation of the reference potential. Here, adjustment of the oxygen concentration around the reference electrode 42 by the reference-gas adjustment pump cell 90 has been conventionally performed; however, identification of the deviation of the reference potential using the voltage Vrg across the ground and the reference electrode 42 has not been performed. Thus, conventionally, excess or deficiency in the movement amount of oxygen achieved by the reference-gas adjustment pump cell 90 occurs, and the oxygen concentration around the reference electrode 42 may not be maintained in an appropriate state (a normal oxygen concentration of the reference gas). In the gas sensor 100 in this embodiment, the CPU 97 controls the reference-gas adjustment pump cell 90 based on the deviation of the reference potential identified using the voltage Vrg, thus the reference-gas adjustment pump cell 90 can be controlled more appropriately, and the oxygen concentration around the reference electrode 42 is likely to be maintained in an appropriate state.

The present invention is not limited to the above-described embodiment, and can be carried out by various modes as long as they belong to the technical scope of the invention.

In the above embodiment, the control device 95 adjusts the oxygen concentration around the reference electrode 42 based on a comparison between the measured voltage Vrg and the acceptable range, in other words, based on a result of identification of the deviation of the reference potential; however, without being limited to this, the control device 95 may correct the control of the pump cells 21, 50, 41 based on the deviation of the reference potential, for example. FIG. 5 is a flowchart illustrating an example of a control correction process. The controller 96 stores this routine, for example, in the storage unit 98. The controller 96 repeatedly executes this routine, for example, every elapse of a predetermined time. When the control correction process routine is started, the CPU 97 of the controller 96 measures the voltage Vrg by performing the same process as in step S100 in the aforementioned reference potential adjustment process. Subsequently, the CPU 97 calculates the difference value ΔVrg (=a measured value–a normal value) between a measured value of the voltage Vrg and a normal value (step S210). The CPU 97 then corrects the control of the pump cells 21, 50, 41 based on the difference value ΔVrg (step S220), and ends this routine. The correction of the control of the pump cells 21, 50, 41 may be, for example, correction to measured values of voltages related to the control, or correction to target values of voltages related to the control. Since the difference value ΔVrg corresponds to the deviation amount of the reference potential, the effect of the deviation of the reference potential can be canceled by correcting measured values or target values of voltages related to the control of the pump cells 21, 50, 41 based on the difference value ΔVrg, and the same control as in the case where substantially no deviation of the reference potential occurs can be performed. For example, in the above embodiment, the oxygen concentration around the electrodes 22, 51, 44 is lower than the oxygen concentration around the reference electrode 42, thus when the reference potential of the reference electrode 42 is deviated to be higher than a normal value (the difference value ΔVrg is positive), the voltages V0 to V2 measured by the voltage acquisition units 85 to 87 are measured as values which are deviated to be higher in absolute value. When the reference potential of the reference electrode 42 is deviated to be lower than a normal value (the difference value ΔVrg is negative), the voltages V0 to V2 measured by the voltage acquisition units 85 to 87 are measured as values which are deviated to be lower in absolute value. Thus, the CPU 97 calculates, as post-correction voltages V0 to V2, the values obtained by subtracting the difference value ΔVrg from the respective absolute values of measured values of the voltages V0 to V2 acquired by the voltage acquisition units 85 to 87. The CPU 97 performs the adjustment pump control process and the measurement pump control process by comparing the post-correction voltages V0 to V2 with the aforementioned target values V0* to V2*. Alternatively, the CPU 97 may calculate, as post-correction target values V0* to V2*, the values obtained by adding the difference value ΔVrg to the absolute values of the target values V0* to V2*. In this case, the CPU 97 performs the adjustment pump control process and the measurement pump control process by comparing measured values of the voltages V0 to V2 with the post-correction target values V0* to V2*. Each time step S220 in the control correction process is executed, the CPU 97 updates the correction amount (specifically, the difference value ΔVrg) to the adjustment pump control process and the measurement pump control process. The aforementioned correction based on the deviation of the reference potential may be made for at least one of the adjustment pump control process or the measurement pump control process, or may be made for at least one of the main pump control process, the auxiliary pump control process, or the measurement pump control process. However, since the measurement pump control process has the most effect on the accuracy of measurement of the NOx concentration, when the control correction process in FIG. 5 is performed, the CPU 97 preferably performs the aforementioned correction based on the deviation of the reference potential for at least the measurement pump control process. When the oxygen concentration in the measurement-object gas is detected based on the voltage Vref acquired by the voltage acquisition unit 88, the CPU 97 may make the same correction to the voltage Vref in step S220 as the aforementioned correction to the voltages V0 to V2.

In the above embodiment, the gas sensor 100 does not need to include the reference-gas adjustment pump cell 90 and the power supply circuit 92. Also, in this case, the controller 96 can perform the control correction process in FIG. 5.

In the above embodiment, the voltage Vrg is the voltage across the connector electrode 71f which is a terminal of the heater 72, and the reference electrode 42, but the configuration is not limited thereto. For example, the voltage Vrg is not limited to the voltage across a terminal of the heater 72 and the reference electrode 42, and may be the voltage across a terminal included in the sensor element 101 and connected to the ground, and the reference electrode 42. Alternatively, without being limited to a terminal included in the sensor element 101, the voltage across the ground and the reference electrode 42 may be measured. For example, the voltage across another ground not connected to any connector electrode 71 of the sensor element 101 and the reference electrode 42 may be measured, and the deviation of the reference potential may be identified based on the voltage. The inventors have confirmed by experiments that not only the voltage Vrg in the above embodiment, but also the voltage across another ground not connected to any connector electrode 71 of the sensor element 101 and the reference electrode 42 also changes according to a change in the oxygen concentration around the reference electrode 42, and the deviation of the reference potential can be identified based on the voltage.

Figure 6:
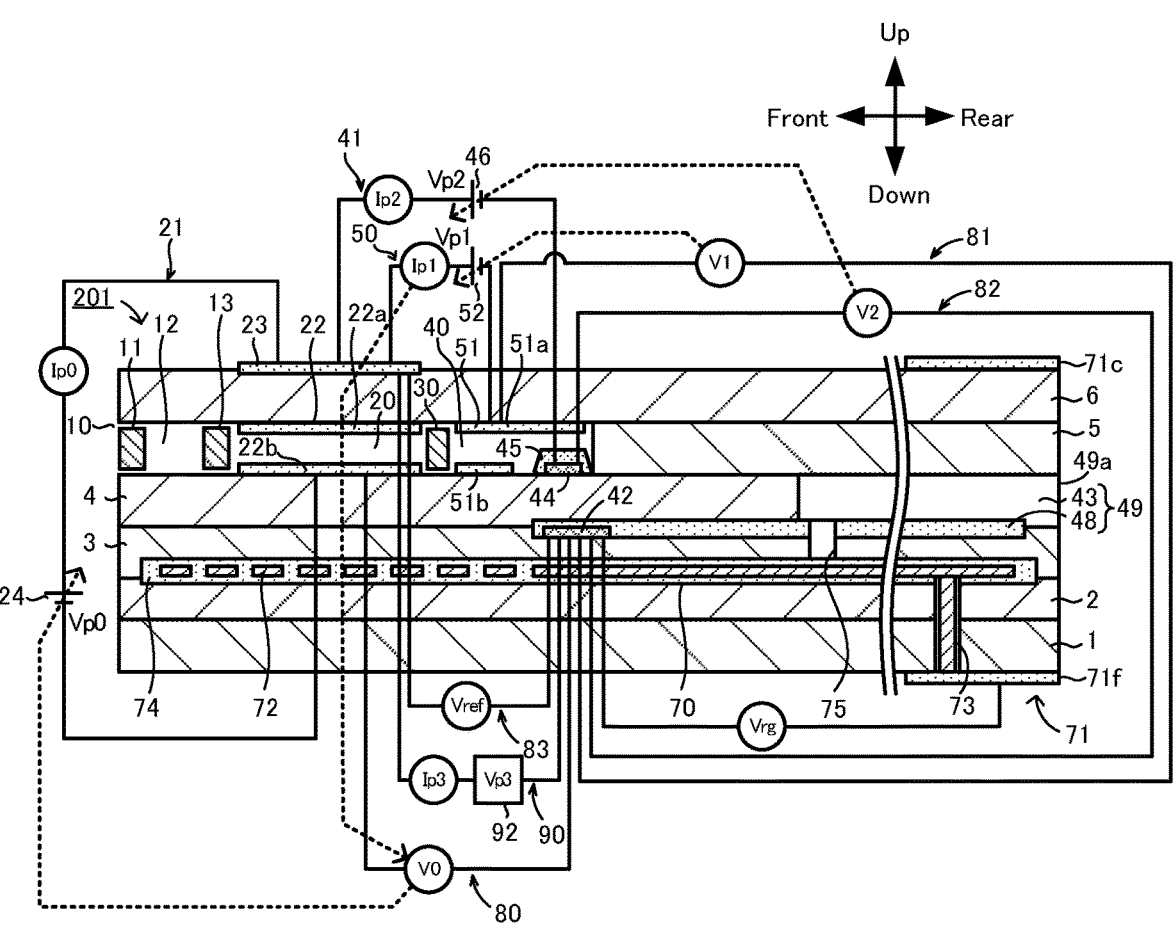
FIG. 6 is a schematic cross-sectional view of a sensor element 201 according to a modification.

In the aforementioned reference potential adjustment process in FIG. 5, the CPU 97 controls the reference-gas adjustment pump cell 90 based on the identification (step S110) of the deviation of the reference potential based on the voltage Vrg (step S120, S130), and in the aforementioned control correction process in FIG. 6, the control of the pump cells 21, 50, 41 is corrected based on the identification (step S210) of the deviation of the reference potential based on the voltage Vrg (step S220), but the configuration is not limited thereto. For example, when the identified deviation of the reference potential exceeds the acceptable range, such as the case where negative determination is made in step S110, or the case where the difference value ΔVrg calculated in step S210 does not fall within the acceptable range, the CPU 97 may inform of abnormality of the reference potential. For example, the CPU 97 may output a signal informing of abnormality of the reference potential to the engine ECU. In this manner, the CPU 97 may make only a diagnosis on the deviation of the reference potential.

In the above embodiment, the reference-gas introduction portion 49 includes the reference-gas introduction space 43 and the reference-gas introduction layer 48; however, the reference-gas introduction portion 49 only needs to introduce the reference gas from the outside of the sensor element 101 to the reference electrode 42. For example, the reference-gas introduction portion 49 may include at least one of the reference-gas introduction space 43 or the reference-gas introduction layer 48.

In the above embodiment, the gas sensor 100 detects the NOx concentration as the specific gas concentration, but without being limited to this, another oxide concentration may be used as the specific gas concentration. In the case where the specific gas is an oxide, as in the above embodiment, oxygen is produced when the specific gas itself is reduced in the third internal cavity 61, thus the CPU 97 can detect the specific gas concentration by acquiring a detection value corresponding to the oxygen. Alternatively, the specific gas may be a non-oxide such as ammonia. When the specific gas is a non-oxide, after the specific gas is converted to an oxide (for example, ammonia is converted to NO), oxygen is produced when the gas after conversion is reduced in the third internal cavity 61, thus the CPU 97 can acquire a detection value corresponding to the oxygen to detect the specific gas concentration. In this manner, regardless of whether the specific gas is an oxide or a non-oxide, the gas sensor 100 can detect the specific gas concentration based on the oxygen produced from the specific gas in the third internal cavity 61.

In the above embodiment, the sensor element 101 of the gas sensor 100 includes the first internal cavity 20, the second internal cavity 40, and the third internal cavity 61, but the configuration is not limited thereto. For example, as in the sensor element 201 in FIG. 6, the third internal cavity 61 may not be provided. In the sensor element 201 according to a modification illustrated in FIG. 6, the gas inlet 10, the first diffusion controlling section 11, the buffer space 12, the second diffusion controlling section 13, the first internal cavity 20, the third diffusion controlling section 30, and the second internal cavity 40 are provided next to one another between the lower surface of the second solid electrolyte layer 6 and the upper surface of the first solid electrolyte layer 4 in a communicating manner in that order. In addition, the measurement electrode 44 is disposed on the upper surface of the first solid electrolyte layer 4 in the second internal cavity 40. The measurement electrode 44 is covered by a fourth diffusion controlling section 45. The fourth diffusion controlling section 45 is a film formed of a ceramic porous body composed of, for example, alumina ($Al_2O_3$). As the fourth diffusion controlling section 60 according to the above embodiment, the fourth diffusion controlling section 45 has a role of limiting the amount of NOx flowing to the measurement electrode 44. Moreover, the fourth diffusion controlling section 45 also functions as a protective film for the measurement electrode 44. The ceiling electrode portion 51a of the auxiliary pump electrode 51 is provided to extend to a position directly above the measurement electrode 44. As in the above-described embodiment, thus configured sensor element 201 can also detect the NOx concentration based on the pump current Ip2, for example. In this case, the periphery of the measurement electrode 44 functions as a measurement chamber.

In the above embodiment, the element body of the sensor element 101 is a layered body having a plurality of solid electrolyte layers (i.e., layers 1 to 6), but is not limited thereto. The element body of the sensor element 101 may have at least one oxygen-ion-conductive solid electrolyte layer, and may be provided with a measurement-object gas flow portion therein. For example, the layers 1 to 5 other than the second solid electrolyte layer 6 in FIG. 1 may be structural layers (e.g., layers composed of alumina) composed of a material other than that of solid electrolyte layers. In this case, the electrodes in the sensor element 101 may be disposed on the second solid electrolyte layer 6. For example, the measurement electrode 44 in FIG. 1 may be disposed on the lower surface of the second solid electrolyte layer 6. Moreover, the reference-gas introduction space 43 may be provided in the spacer layer 5 instead of the first solid electrolyte layer 4, and the reference-gas introduction layer 48 may be provided between the second solid electrolyte layer 6 and the spacer layer 5 instead of being provided between the first solid electrolyte layer 4 and the third substrate layer 3, and the reference electrode 42 may be provided rearward of the third internal cavity 61 and on the lower surface of the second solid electrolyte layer 6.

In the above embodiment, the controller 96 sets (feedback-controls) the target value V0* of the voltage V0 based on the pump current Ip1 so that the pump current Ip1 reaches the target current Ip1*, and feedback-controls the pump voltage Vp0 so that the voltage V0 reaches the target value V0*, but may perform another control. For example, the controller 96 may feedback-control the pump voltage Vp0 based on the pump current Ip1 so that the pump current Ip1 reaches the target current Ip1*. Specifically, the controller 96 may omit acquisition of the voltage V0 from the main-pump-control oxygen-partial-pressure detection sensor cell 80 and setting of the target value V0*, and may directly control (eventually, control the pump current Ip0) the pump voltage Vp0 based on the pump current Ip1.

In the above embodiment, the oxygen concentration adjustment chamber has the first internal cavity 20 and the second internal cavity 40, but is not limited thereto, and the oxygen concentration adjustment chamber may further include, for example, another internal cavity, or one of the first internal cavity 20 and the second internal cavity 40 may be omitted. Similarly, in the above embodiment, the adjustment pump cell has the main pump cell 21 and the auxiliary pump cell 50, but is not limited thereto, and the adjustment pump cell may further include, for example, another pump cell, or one of the main pump cell 21 and the auxiliary pump cell 50 may be omitted. For example, when the oxygen concentration in the measurement-object gas can be sufficiently reduced only by the main pump cell 21, the auxiliary pump cell 50 may be omitted. When the auxiliary pump cell 50 is omitted, the controller 96 may perform the main pump control process only as the adjustment pump control process. Also, in the main pump control process, the aforementioned setting of the target value V0* based on the pump current Ip1 may be omitted. Specifically, a predetermined target value V0* is pre-stored in the storage unit 98, and the controller 96 may control the main pump cell 21 by feedback-controlling the voltage Vp0 of the variable power source 24 so the voltage V0 reaches the target value V0*. When the auxiliary pump cell 50 is omitted, the inner pump electrode 22 corresponds to an inner adjustment electrode, the voltage V0 corresponds to an adjustment voltage, and the target value V0* corresponds to an adjustment voltage target value.

In the above embodiment, the outer pump electrode 23 serves as an outer main pump electrode disposed in a part of the main pump cell 21 to be exposed to the measurement-object gas at the outer side of the sensor element 101, an outer auxiliary pump electrode disposed in a part of the auxiliary pump cell 50 to be exposed to the measurement-object gas at the outer side of the sensor element 101, an outer measurement electrode disposed in a part of the measurement pump cell 41 to be exposed to the measurement-object gas at the outer side of the sensor element 101, and a measurement-object-gas side electrode disposed in a part of the reference-gas adjustment pump cell 90 to be exposed to the measurement-object gas at the outer side of the sensor element 101, but is not limited thereto. At least one of the outer main pump electrode, the outer auxiliary pump electrode, the outer measurement electrode, or the measurement-object-gas side electrode may be provided at the outer side of the sensor element 101 in addition to the outer pump electrode 23. The measurement-object-gas side electrode of the reference-gas adjustment pump cell 90 may be provided in the sensor element 101 so that the measurement-object-gas side electrode comes into contact with the measurement-object gas. For example, the measurement-object-gas side electrode may be disposed at the inner side of the sensor element 101 instead of being disposed at the outer side, namely, may be disposed in the measurement-object gas flow portion of the sensor element 101. For example, the inner pump electrode 22 may serve as both the electrode (inner main pump electrode) of the main pump cell 21 and the measurement-object-gas side electrode of the reference-gas adjustment pump cell 90, and the reference-gas adjustment pump cell 90 may pump in or pump out the oxygen between the periphery of the inner pump electrode 22 and the periphery of the reference electrode 42.

What is claimed is:

1. A gas sensor comprising a sensor element and a control device, and being configured to detect a specific gas concentration which is a concentration of a specific gas in a measurement-object gas, the sensor element including:

an element body including an oxygen-ion-conductive solid electrolyte layer and provided with a measurement-object gas flow portion therein, the measurement-object gas flow portion being configured to introduce the measurement-object gas and cause the measurement-object gas to flow therethrough;

a measurement electrode disposed in a measurement chamber of the measurement-object gas flow portion; and a reference electrode disposed inside the element body to come into contact with a reference gas that serves as a reference for detection of the specific gas concentration, wherein the control device is configured to measure a voltage across a ground and the reference electrode, and identify a deviation of a reference potential that is an electrical potential of the reference electrode by performing one or more of magnitude relationship comparison of the measurement value with a normal value, calculation of a difference or a ratio between the measurement value and the normal value, comparison of the measurement value with a predetermined acceptable range, and determination as to whether a measurement value is in the predetermined acceptable range.

2. The gas sensor according to claim 1, wherein the sensor element includes a reference-gas adjustment pump cell including a measurement-object-gas side electrode and the reference electrode, the measurement-object-gas side electrode being provided in the element body to come into contact with the measurement-object gas, and when the measured voltage is higher than a predetermined acceptable range, the control device controls the reference-gas adjustment pump cell so that oxygen is pumped out from a periphery of the reference electrode into a periphery of the measurement-object-gas side electrode, and when the measured voltage is lower than the predetermined acceptable range, the control device controls the reference-gas adjustment pump cell so that oxygen is pumped into the periphery of the reference electrode from the periphery of the measurement-object-gas side electrode.

3. The gas sensor according to claim 1, wherein the sensor element includes a measurement pump cell including an outer measurement electrode and the measurement electrode, the outer measurement electrode being provided outside the element body to come into contact with the measurement-object gas, the control device being configured to perform a measurement pump control process for controlling the measurement pump cell so that a measurement voltage that is a voltage across the measurement electrode and the reference electrode reaches a measurement voltage target value, and to detect the specific gas concentration in the measurement-object gas based on a pump current which flows through the measurement pump cell by the measurement pump control process, and the control device being configured to correct control of the measurement pump cell in the measurement pump control process based on the identified deviation of the reference potential.

4. The gas sensor according to claim 3, wherein the sensor element includes an adjustment pump cell including an inner adjustment electrode and adjusts an oxygen concentration in an oxygen concentration adjustment chamber, the inner adjustment electrode being disposed in the oxygen concentration adjustment chamber located upstream of the measurement chamber of the measurement-object gas flow portion, the control device being configured to perform an adjustment pump control process for adjusting the oxygen concentration in the oxygen concentration adjustment chamber by controlling the adjustment pump cell so that an adjustment voltage that is a voltage across the inner adjustment electrode and the reference electrode reaches an adjustment voltage target value, and the control device being configured to correct control of the adjustment pump cell in the adjustment pump control process based on the identified deviation of the reference potential.

5. The gas sensor according to claim 1, wherein the sensor element includes a ground terminal connected to the ground, and the control device measures a voltage across the ground terminal and the reference electrode as a voltage across the ground and the reference electrode.

6. The gas sensor according to claim 5, wherein the sensor element includes a heater that heats the element body, and the ground terminal is a terminal of the heater.

7. A method of identifying a deviation of a reference potential of a gas sensor that detects a specific gas concentration which is a concentration of a specific gas in a measurement-object gas, the gas sensor including a sensor element having:

an element body including an oxygen-ion-conductive solid electrolyte layer and provided with a measurement-object gas flow portion therein, the measurement-object gas flow portion introducing the measurement-object gas and causing the measurement-object gas to flow therethrough;

a measurement electrode disposed in the measurement-object gas flow portion; and a reference electrode disposed inside the element body to come into contact with a reference gas that serves as a reference for detection of the specific gas concentration, the method including a step of measuring a voltage across a ground and the reference electrode, and identify a deviation of the reference potential that is an electrical potential of the reference electrode by performing one or more of magnitude relationship comparison of the measurement value with a normal value, calculation of a difference or a ratio between the measurement value and the normal value, comparison of the measurement value with a predetermined acceptable range, and determination as to whether a measurement value is in the predetermined acceptable range.

* * * * *